Dec. 29, 1931.  S. A. WILDE  1,838,800
BROILER
Filed June 9, 1930    2 Sheets-Sheet 1

INVENTOR=
Samuel A. Wilde

BY John E. R. Hayes
ATTORNEY=

Dec. 29, 1931. S. A. WILDE 1,838,800
BROILER
Filed June 9, 1930 2 Sheets-Sheet 2
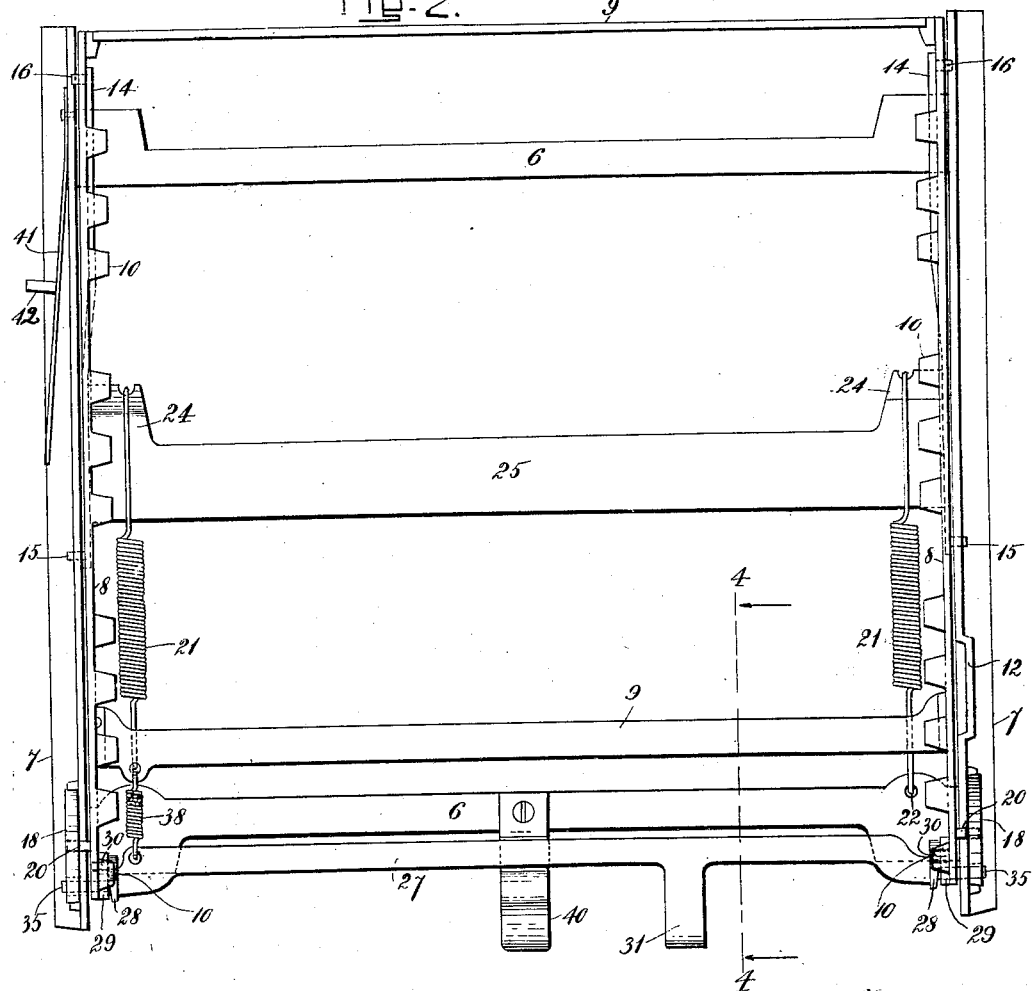

Patented Dec. 29, 1931

1,838,800

UNITED STATES PATENT OFFICE

SAMUEL A. WILDE, OF TAUNTON, MASSACHUSETTS, ASSIGNOR TO GLENWOOD RANGE COMPANY, OF TAUNTON, MASSACHUSETTS, A CORPORATION OF MASSACHUSETTS

BROILER

Application filed June 9, 1930. Serial No. 459,846.

The invention relates to an improvement in broilers of the type in which the article to be cooked contained in a pan is exposed to heat from an overhead burner, as in the oven of a gas stove.

The object of the invention is to provide an adjustable pan support whereby the article to be cooked may be set in a determinate adjusted position with relation to the burner, either near the burner or away from it; also, a support which will permit of the article being readily moved in and out of the oven.

The invention can best be seen and understood by reference to the drawings in which—

Fig. 2 is a plan of the adjustable pan support.

Fig. 3 is a side elevation thereof, and

Referring to the drawings:—

Figure 1:
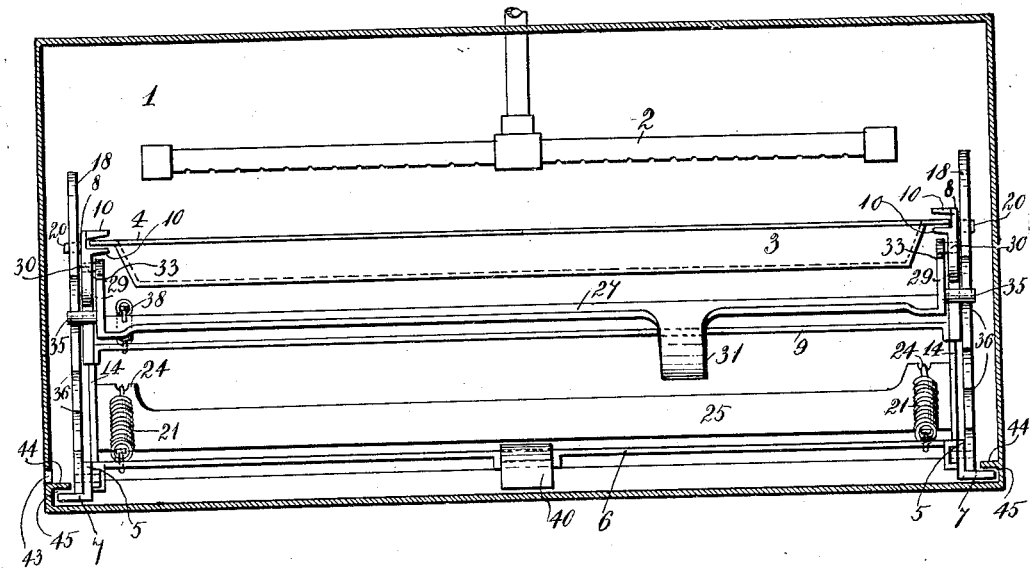
Figure 1 is a front elevation of an oven with overhead burner therein and the adjustable pan support located in the oven beneath the burner.
Figure 4:
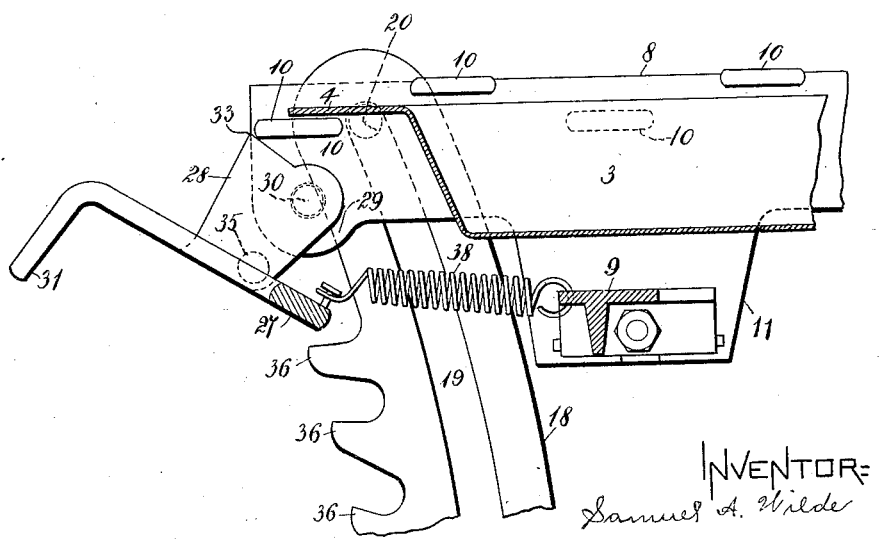
Fig. 4 is a section taken on the line 4—4 of Fig. 2.

1 represents the oven, 2 the overhead burner therein, 3 the adjustable pan support resting in the bottom of the oven below the burner, and 4 the pan borne by its adjustable support.

The adjustable pan support comprises the following constructions. 5, 5, and 6, 6, represent respectively the side and end bars of a rectangular bottom frame adapted to rest or slide, as may be desired, on the bottom of the oven. The side bars 5, 5 are preferably provided with lateral flanges 7 to give to these bars a relatively broad bearing on the oven bottom.

Arranged in superposed relation to the bottom and having substantially the same form as this frame is a top frame of which 8, 8 represent its side bars and 9, 9 its end bars. The top frame bears the pan 4 in which is contained the article to be cooked. The flanged side edges of this pan are disposed to fit between spaced rows of lugs 10 projecting laterally inward from the side bars of the top frame, the pan being slid into place from the front. To permit of the insertion and removal of the pan the front one of the end bars of the top frame occupies a lowered position with relation to the frame being secured at its opposite ends to ears 11 depending from the side bars just back of the forward ends of these bars. Inasmuch as the top and bottom frames are of substantially the same size and the top frame rests upon the bottom frame when the support is collapsed the side bars of the bottom frame are accordingly fitted with offsets 12 for receiving the ears 11 when the frames come together.

The pan-bearing top frame is supported in the following manner: Pivoted to turn on the side bars 5, 5 of the bottom frame at about the middle of their extension are arms 14, 14. These arms extend from the interior sides of the side bars and their pivotal connection thereto is secured by trunnions 15 on the ends of the bars extending outward into holes in the side bars. The arms 14, 14 have backward extensions and at their outer ends are pivoted to the side bars 8, 8 of the top frame at the rear end of this frame by means of trunnions 16 on the ends of the arms extending through holes in the side bars of the top frame.

Fixed to project upward from the exterior sides of the side bars 5, 5 of the bottom frame with extension by the forward ends of the side bars of the top frame are uprights 18 each having a curved slot 19 in it. Fitting to slide within these slots are pins 20 extending laterally from the side bars of the top frame at the forward end of this frame. The curvature of the slots 19 in the respective uprights corresponds with the curve described by the pivotal connection between the arms 14, 14 and the top frame as the top frame is raised from a position resting on the bottom frame to a position where the pins 20 are engaging the top ends of the slots in the uprights which define the limit to which the top frame can be raised. Thus mounted the top frame will, during the raising and lowering thereof, maintain a position at all times substantially parallel with the bottom frame.

The pan-bearing top frame will occupy by gravity its lowered position resting on the bottom frame, and is raised by lifting force applied to the forward end of the frame. To assist in raising the top frame, in order that it may be lifted by the application of but very little force, and reversely for obtaining a gentle gravity drop of the top frame, a set of coiled springs 21, 21 are employed. The inner hook-bearing ends 22 of these springs are connected to the front end bar 6 of the bottom frame, while the outer hook-bearing ends 23 of the springs connect with upturned offsets 24 from a bar 25 interposed between the arms 14, 14 adjacent the inner ends thereof and rigidly fixed thereto. The offsets 24 to which the outer ends of the springs are secured are upturned with relation to the arms 14, 14 in order that the springs may exert lifting force on the pan-bearing top frame even when this frame is occupying its lowest position resting on the bottom frame, and thus exert force for lifting the top frame when the lift is initially started. The tension of the springs is preferably such that while the top frame will normally fall by gravity to its lowermost position resting on the bottom frame, yet the springs will permit only of a gentle drop, and reversely the tension of the springs will enable the top frame to be lifted by the application of very little force.

To provide means by which the pan-bearing top frame may be lifted, and for the purpose also of locking the top frame in any one of a number of elevated positions mechanism is provided as follows: Interposed to lie between the side bars 8, 8 of the top frame in front of its forward end bar 9, and in substantially the same plane with this end bar, is a rocker bar 27. This rocker bar is provided with upturned ends 28, 28 which extend respectively upward by the interior sides of ears 29, 29 formed on the inner forward ends of the side bars 8, 8 of the top frame and depending therefrom. The upturned ends of the rocker bar are pivoted to these ears by trunnions 30 on the ends which enter holes in the ears. Thus mounted the rocker bar is capable of a forward and backward rocking movement which effect may be manually obtained by means of a bent fingerpiece 31 on the rocker bar. The forward rocking movement of the rocker bar is limited and defined by the contact of the forward top edge portions 33 of its upturned ends with the foremost set of the lugs 10 on the side bars of the top frame which support the pan. These foremost sets of lugs form stops with which the turned ends 28, 28 of the rocker bar have contact, and thereby limit and define the forward rocking movement of the rocker bar as aforesaid. From its forward rocked position as defined by these stops the rocker bar is capable of a pronounced backward movement. This backward movement is limited and defined by outwardly-projecting studs 35 on the ends of the rocker bar which, as the rocker bar is moved backward, will come in contact with the forward edges of the uprights 18, 18 on the bottom frame. During such backward movement of the rocker bar the studs 35, 35 on its ends will pass inward over any one set of a series of teeth 36 on the outer edges of the respective uprights dependent upon the elevation of the top frame with relation to the bottom frame, and will rest upon these teeth and thereby operate to support the pan-bearing top frame in an adjusted elevated position with relation to the burner. When the lugs are resting upon the top set of teeth the pan-bearing top frame will be supported in its maximum raised position with relation to the burner. From this maximum raised position the top frame and pan carried by it may be dropped and set in various adjusted lowered positions with relation to the burner corresponding with the various sets of teeth on the uprights with which the studs on the ends of the rocker bar are moved to have engagement until the top frame has been moved down to a position where it rests upon the bottom frame which defines the lowest position of the pan with relation to the burner. The rocker bar is normally maintained in its backward rocked or locking position by means of springs 38 fixed at one end to the rocker bar and at its opposite end to the adjacent forward end bar 9 of the top frame. This spring permits of the rocker bar being moved outward when lifting force is applied to the bent fingerpiece 31 on it for elevating the top frame and pan carried by it. When the top frame and pan have been moved upward to the desired elevated position the rocker bar may then be moved backward into a locking position with its studs 35, 35 engaging some one of the sets of teeth 36 on the uprights by the manual tipping of the thumbpiece. The spring 38 will then act to maintain the rocker bar in its locked position until manually released.

As previously explained, the pan support is essentially adapted to be placed in an oven, its bottom frame sliding in and out on the bottom of the oven. For moving the support in or out of the oven the forward end bar 6 of its bottom frame has a bent fingerpiece 40 fixed to it.

When the support is used within an oven it is desirable that it be normally prevented from being drawn entirely out of the oven. To prevent such withdrawal one of the side bars 5 of the bottom frame has secured to its rear end on the outer side thereof a bent spring 41 beading an out-turned stud 42. The bottom frame may be arranged to fit rather snugly between the sides of the oven so that the stud on the spring 41 will bear tensionally against the side of the oven as the support is moved in or out of the oven without affecting such movement. Formed in the side wall of the oven near its front, in the path of the stud 42 on the spring, is a hole 43 so that when the support has been moved forward out of the oven a determinate distance the stud on the spring will automatically enter this hole in the side wall of the oven and prevent further outward movement of the support. The stud, however, may be released from the hole in the side wall of the oven by the application of manual pressure to the spring for effecting such release. In order that the entire support may be drawn for some considerable distance out of the oven so that easy access may be had to the pan and article within it as occasion requires, it is preferred that the bottom corner edges of the oven be provided with flanges 44 which co-operate with the adjacent bottom wall of the oven to form ways 45 within which the flanges 7 on the side bars of the bottom frame may run.

Having thus fully described my invention, I claim and desire to secure by Letters Patent of the United States:—

1. An adjustable pan support for a broiler having an overhead burner comprising a set of superposed frames on the top of one of which the pan is mounted, arms connecting said frames and pivoted respectively thereto, the pivotal connection of said arms to the pan-carrying top frame lying back of the pivotal connection of said arms to the bottom frame, said arms being arranged also whereby the pan-carrying top frame may rest upon the bottom frame or be raised or lowered with relation thereto and the pan carried thereby adjustably positioned with relation to the burner, uprights fixed to the bottom frame at the forward end thereof with extension upward by the top frame, said uprights having slotted ways therein with curvature substantially like the arc described by the pivotal connections between said arms and said top frame as the top frame is moved up or down with relation to the bottom frame, studs borne by the top frame contained within the slotted ways of the respective uprights, and releasable means for retaining the pan-carrying top frame in adjusted position with relation to the burner.

2. An adjustable pan support for a broiler having an overhead burner comprising a set of superposed frames on the top one of which the pan is mounted, arms connecting said frames and pivoted respectively thereto, the pivotal connection of said arms to the pan-carrying top frame lying back of the pivotal connection of said arms to the bottom frame, said arms being arranged also whereby the pan-carrying top frame may rest upon the bottom frame or be raised or lowered with relation thereto and the pan carried thereby adjustably positioned with relation to the burner, uprights fixed to the bottom frame at the forward end thereof with extension upward by the top frame, said uprights having slotted ways therein with curvature substantially like the arc described by the pivotal connections between said arms and said top frame as the top frame is moved up or down with relation to the bottom frame, studs borne by the top frame contained within the slotted ways of the respective uprights, tensional means assisting in the raising of the pan-carrying top frame and in retarding the lowering of said frame, and releasable means for retaining the pan-carrying top frame in adjusted position with relation to the burner.

3. An adjustable pan support for a broiler having an overhead burner comprising a set of superposed frames on the top one of which the pan is mounted, arms pivoted to said frames and arranged whereby the pan-carrying top frame may be raised or lowered with relation to the bottom frame and the pan adjustably positioned with relation to the burner, uprights fixed to the bottom frame at the forward end thereof with extension upward by the top frame at the forward end thereof, said uprights having slotted ways therein and teeth along the front side edges thereof, studs borne by the pan-carrying top frame contained within the slotted ways of the respective uprights, a pin-carrying rocker bar, and means for pivotally securing said rocker bar to said top frame whereby the pins carried by it may have releasable engagement with the teeth on said uprights on rocking the bar.

4. An adjustable pan support for a broiler having an overhead burner comprising a set of superposed frames on the top one of which the pan is mounted, arms pivoted to said frames and arranged whereby the pan-carrying top frame may be raised or lowered with relation to the bottom frame and the pan adjustably positioned with relation to the burner, uprights fixed to the bottom frame at the forward end thereof with extension upward by the top frame at the forward end thereof, said uprights having slotted ways therein, studs borne by the top frame contained within the slotted ways of the respective uprights, a rocker bar pivoted to said top frame, and means whereby said rocker bar may have releasable locking engagement with said uprights for maintaining said pan-carrying top frame in an adjusted position with relation to the burner.

5. An adjustable pan support for a broiler having an overhead burner comprising a set of superposed frames on the top one of which the pan is mounted, arms pivoted to said frames and arranged whereby the pan-carrying top frame may be raised or lowered with relation to the bottom frame and the pan adjustably positioned with relation to the burner, uprights fixed to the bottom frame at the forward end thereof with extension upward by the top frame at the forward end thereof, said uprights having slotted ways therein, studs borne by the top frame contained within the slotted ways of the respective uprights, a rocker bar pivoted to said top frame, means whereby said rocker bar may have releasable locking engagement with said uprights for maintaining said pan-carrying top frame in an adjusted position with relation to the burner, and tensional means for maintaining said rocker bar in its locking position.

6. An adjustable pan support for a broiler having an overhead burner comprising a set of superposed frames on the top one of which the pan is mounted, arms pivoted to said frames and arranged whereby the pan-carrying top frame may be raised or lowered with relation to the bottom frame and the pan adjustably positioned with relation to the burner, uprights fixed to the bottom frame at the forward end thereof with extension upward by the top frame at the forward end thereof, said uprights having slotted ways therein, studs borne by the top frame contained within the slotted ways of the respective uprights, tensional means assisting in the raising of the pan-carrying top frame and in retarding the lowering of said frame, a rocker bar pivoted to the pan-carrying top frame, and means whereby said rocker bar may have releasable locking engagement with said uprights for maintaining said pan-carrying top frame in an adjusted position with relation to the burner.

7. An adjustable pan support for a broiler having an overhead burner comprising a set of superposed frames on the top one of which the pan is mounted, arms pivoted to said frames and arranged whereby the pan-carrying top frame may be raised or lowered with relation to the bottom frame and the pan adjustably positioned with relation to the burner, uprights fixed to the bottom frame at the forward end thereof with extension upward by the top frame at the forward end thereof, said uprights having slotted ways therein, studs borne by the top frame contained within the slotted ways of the respective uprights, tensional means assisting in the raising of the pan-carrying top frame and in retarding the lowering of said frame, a rocker bar pivoted to the pan-carrying top frame, means whereby said rocker bar may have releasable locking engagement with said uprights for maintaining said pan-carrying top frame in an adjusted position with relation to the burner, and tensional means for maintaining the rocker bar in its locking position.

SAMUEL A. WILDE.